(12) United States Patent
Chow et al.

(10) Patent No.: US 7,937,232 B1
(45) Date of Patent: May 3, 2011

(54) DATA TIMESTAMP MANAGEMENT

(75) Inventors: Paxton Ming Kai Chow, Walnut Creek, CA (US); Vera Alexandrova Snowball, Newark, CA (US); Barton George Lane, III, Pleasanton, CA (US); Sophia Leonidovna Shtilman, Sunnyvale, CA (US); Chalee Asavathiratham, New York, NY (US); Abhijit Majumdar, Pleasanton, CA (US); Sherk Chung, San Francisco, CA (US); Yi Wang, Foster City, CA (US); Paul Tran, Sacramento, CA (US)

(73) Assignee: Pivotal Systems Corporation, Pleasanton, CA (US)

( * ) Notice: Subject to any disclaimer, the term of this patent is extended or adjusted under 35 U.S.C. 154(b) by 0 days.

(21) Appl. No.: 11/821,810

(22) Filed: Jun. 25, 2007

Related U.S. Application Data

(60) Provisional application No. 60/819,430, filed on Jul. 6, 2006.

(51) Int. Cl.
*G01R 29/02* (2006.01)
(52) U.S. Cl. ............ 702/79; 702/89; 702/125; 702/176; 713/400; 713/500
(58) Field of Classification Search .................... 702/66, 702/69, 79, 83, 89, 125, 176, 178; 713/400, 713/500
See application file for complete search history.

(56) References Cited

U.S. PATENT DOCUMENTS

| 5,140,408 | A | * | 8/1992 | Kaite et al. ..................... 348/660 |
| 5,444,637 | A | * | 8/1995 | Smesny et al. ................. 702/127 |
| 5,652,627 | A | * | 7/1997 | Allen ............................. 348/497 |
| 6,097,699 | A | * | 8/2000 | Chen et al. ..................... 370/231 |
| 6,134,379 | A | * | 10/2000 | LaMacchia ...................... 386/54 |
| 6,301,643 | B1 | * | 10/2001 | Crockett et al. ............... 711/162 |
| 6,748,481 | B1 | * | 6/2004 | Parry et al. .................... 711/100 |
| 6,981,165 | B2 | * | 12/2005 | Marik ............................ 713/401 |
| 7,103,124 | B1 | * | 9/2006 | Lindskog et al. ............. 375/354 |
| 7,200,779 | B1 | * | 4/2007 | Coss et al. ...................... 714/48 |
| 2002/0022945 | A1 | * | 2/2002 | Takayasu et al. ............. 702/186 |
| 2004/0264612 | A1 | * | 12/2004 | Allen ............................. 375/354 |
| 2007/0005297 | A1 | * | 1/2007 | Beresniewicz et al. ........ 702/181 |
| 2007/0260410 | A1 | * | 11/2007 | Raymond ........................ 702/81 |

* cited by examiner

*Primary Examiner* — Drew A Dunn
*Assistant Examiner* — Mi'schita' Henson
(74) *Attorney, Agent, or Firm* — Kilpatrick Townsend & Stockton LLP

(57) ABSTRACT

Embodiments of the present invention relate to managing timestamps associated with received data. According to one embodiment, data is collected from a device that generates data at a specified rate, but which lacks a built-in clock. An accurate timestamp is assigned to the data by first taking an absolute timestamp from a reference clock, and then adding a calculated amount of time to each subsequent data point based on an estimate of the sampling frequency of the device. As the generated timestamp drifts from the actual reference clock time, the sampling frequency is re-estimated based on the amount of detected drift.

13 Claims, 13 Drawing Sheets

Typical Data from Separate Sources with Different Reporting Frequencies

| Device A | |
|---|---|
| Timestamp | Value |
| 1:00:00.124 | 1.5 |
|  |  |
| 1:00:00.624 | 1.7 |
| 1:00:01.124 | 2.5 |
|  |  |
| 1:00:01.624 | 3.35 |
| 1:00:02.124 | 1.5 |
|  |  |
| 1:00:02.624 | 2.2 |
| 1:00:03.124 | 2.6 |
|  |  |
| 1:00:03.624 | 1.8 |
| 1:00:04.124 | 3.2 |
|  |  |
| 1:00:04.624 | 1.8 |

| Device B | |
|---|---|
| Timestamp | Value |
|  |  |
| 1:00:00.224 | 1.1 |
|  |  |
|  |  |
| 1:00:01.224 | 1.3 |
|  |  |
|  |  |
| 1:00:02.224 | 2.0 |
|  |  |
|  |  |
| 1:00:03.224 | 2.5 |
|  |  |
|  |  |
| 1:00:04.224 | 2.7 |
|  |  |

FIG. 1

Typical Data from Separate Sources with Same Reporting Intervals

| Device A | |
|---|---|
| Timestamp | Value |
| 1:00:00.124 | 1.5 |
|  |  |
| 1:00:00.624 | 1.7 |
|  |  |
| 1:00:01.124 | 2.5 |
|  |  |
| 1:00:01.624 | 3.35 |
|  |  |
| 1:00:02.124 | 1.5 |
|  |  |
| 1:00:02.624 | 2.2 |
|  |  |
| 1:00:03.124 | 2.6 |
|  |  |
| 1:00:03.624 | 1.8 |
|  |  |
| 1:00:04.124 | 3.2 |
|  |  |
| 1:00:04.624 | 1.8 |
|  |  |

| Device B | |
|---|---|
| Timestamp | Value |
|  |  |
| 1:00:00.238 | 1.0 |
|  |  |
| 1:00:00.738 | 1.1 |
|  |  |
| 1:00:01.238 | 1.3 |
|  |  |
| 1:00:01.738 | 2.0 |
|  |  |
| 1:00:02.238 | 2.0 |
|  |  |
| 1:00:02.738 | 2.1 |
|  |  |
| 1:00:03.238 | 2.5 |
|  |  |
| 1:00:03.738 | 2.3 |
|  |  |
| 1:00:04.238 | 2.7 |
|  |  |
| 1:00:04.738 | 2.5 |

FIG. 2

Example of Generating a Unified View of Data from Out-of-Synch Data Source

| Device A | | Combined Report | | | Device B | |
|---|---|---|---|---|---|---|
| Received Timestamp | Value | Timestamp | Device A Value | Device B Value | Received Timestamp | Value |
| 1:00:00.124 | 1.5 | | | | | |
| | | | | | 1:00:00.238 | 1.0 |
| | | 1:00:00.500 | 1.5 | 1.0 | | |
| 1:00:00.624 | 1.7 | | | | | |
| | | | | | 1:00:00.738 | 1.1 |
| | | 1:00:01.000 | 1.7 | 1.1 | | |
| 1:00:01.124 | 2.5 | | | | | |
| | | | | | 1:00:01.238 | 1.3 |
| | | 1:00:01.500 | 2.5 | 1.3 | | |
| 1:00:01.624 | 3.35 | | | | | |
| | | | | | 1:00:01.738 | 2.0 |
| | | 1:00:02.000 | 3.35 | 2.0 | | |
| 1:00:02.124 | 1.5 | | | | | |
| | | | | | 1:00:02.238 | 2.0 |
| | | 1:00:02.500 | 1.5 | 2.0 | | |
| 1:00:02.624 | 2.2 | | | | | |
| | | | | | 1:00:02.738 | 2.1 |
| | | 1:00:03.000 | 2.2 | 2.1 | | |
| 1:00:03.124 | 2.6 | | | | | |
| | | | | | 1:00:03.238 | 2.5 |
| | | 1:00:03.500 | 2.6 | 2.5 | | |
| 1:00:03.624 | 1.8 | | | | | |
| | | | | | 1:00:03.738 | 2.3 |
| | | 1:00:04.000 | 1.8 | 2.3 | | |
| 1:00:04.124 | 3.2 | | | | | |
| | | | | | 1:00:04.238 | 2.7 |
| | | 1:00:04.500 | 3.2 | 2.7 | | |
| 1:00:04.624 | 1.8 | | | | | |
| | | | | | 1:00:04.738 | 2.5 |
| | | 1:00:05.500 | 1.8 | 2.5 | | |

*FIG. 3*

Example of Generating a Unified View
of Data from Data Sources of Different Frequency
(Values from Slower Source are Duplicated)

| Device A | | Combined Report | | | Device B | |
|---|---|---|---|---|---|---|
| Received Timestamp | Value | Timestamp | Device A Value | Device B Value | Received Timestamp | Value |
| 1:00:00.124 | 1.5 | | | | | |
| | | | | | 1:00:00.238 | 1.0 |
| | | 1:00:00.500 | 1.5 | 1.0 | | |
| 1:00:00.624 | 1.7 | | | | | |
| | | | | | | |
| | | 1:00:01.000 | 1.7 | 1.0 | | |
| 1:00:01.124 | 2.5 | | | | | |
| | | | | | 1:00:01.238 | 1.3 |
| | | 1:00:01.500 | 2.5 | 1.3 | | |
| 1:00:01.624 | 3.35 | | | | | |
| | | | | | | |
| | | 1:00:02.000 | 3.35 | 1.3 | | |
| 1:00:02.124 | 1.5 | | | | | |
| | | | | | 1:00:02.238 | 2.0 |
| | | 1:00:02.500 | 1.5 | 2.0 | | |
| 1:00:02.624 | 2.2 | | | | | |
| | | | | | | |
| | | 1:00:03.000 | 2.2 | 2.0 | | |
| 1:00:03.124 | 2.6 | | | | | |
| | | | | | 1:00:03.238 | 2.5 |
| | | 1:00:03.500 | 2.6 | 2.5 | | |
| 1:00:03.624 | 1.8 | | | | | |
| | | | | | | |
| | | 1:00:04.000 | 1.8 | 2.5 | | |
| 1:00:04.124 | 3.2 | | | | | |
| | | | | | 1:00:04.238 | 2.7 |
| | | 1:00:04.500 | 3.2 | 2.7 | | |
| 1:00:04.624 | 1.8 | | | | | |
| | | | | | | |
| | | 1:00:05.500 | 1.8 | 2.7 | | |

*FIG. 4*

Example of Saved Data using Time-Series Data Agent

| Common Timestamp | Device A Timestamp | Device A Value | Device B Timestamp | Device B Value |
|---|---|---|---|---|
| 1:00:00.500 | 1:00:00.124 | 1.5 | 1:00:00.238 | 1.1 |
| 1:00:01.000 | 1:00:00.624 | 1.7 | 1:00:00.238 | 1.1 |
| 1:00:01.500 | 1:00:01.124 | 2.5 | 1:00:01.238 | 1.3 |
| 1:00:02.000 | 1:00:01.624 | 3.35 | 1:00:01.238 | 1.3 |
| 1:00:02.500 | 1:00:02.124 | 1.5 | 1:00:02.238 | 2.0 |
| 1:00:03.000 | 1:00:02.624 | 2.2 | 1:00:02.238 | 2.0 |
| 1:00:03.500 | 1:00:03.124 | 2.6 | 1:00:03.238 | 2.5 |
| 1:00:04.000 | 1:00:03.624 | 1.8 | 1:00:03.238 | 2.5 |
| 1:00:04.500 | 1:00:04.124 | 3.2 | 1:00:04.238 | 2.7 |
| 1:00:05.500 | 1:00:04.624 | 1.8 | 1:00:04.238 | 2.7 |

*FIG. 10*

DATA TIMESTAMP MANAGEMENT

CROSS-REFERENCE TO RELATED APPLICATION

The instant nonprovisional patent application claims priority to U.S. Provisional patent application No. 60/819,430 filed Jul. 6, 2006 and incorporated by reference in its entirety herein for all purposes.

BACKGROUND OF THE INVENTION

Computer based systems are often used to collect and save data from hardware devices or sensors. Such hardware devices or sensors may be configured to generate data values at a specific rate (e.g. 5 values per second), with each data point having both a value and a particular associated timestamp. Such data is hereafter referred to as "time-series data", and examples of such a series includes but is not limited to continuous voltage readings from a voltmeter or RF (Radio Frequency) voltage values from an RF sensor.

In semiconductor manufacturing environments, time-series data can be important for process control systems. In a simple scenario, a semiconductor manufacturing process control system can monitor data and perform certain actions when data values exceed predefined thresholds. In more complex scenarios, process control systems for semiconductor manufacturing processes can utilize the timestamp linked to each data value to calculate derivatives, and perform actions based upon the rate of rise or drop in a value of a process parameter measured from a sensor.

Time-series data is also important in the development of process control algorithms by permitting observation of a current state of a semiconductor manufacturing process tool at a specific point in time, thereby allowing relational questions to be answered. For example, time-series data allows questions to be asked such as: 1) what was the current value reported from all sensors/devices at time "May 23, 2004 01:00:01.125"?, or 2) when the value from Device A reached 1.5 Volts, what was the measured value from Device B?

Computer systems can typically capture time-series data as received from various hardware devices, and then store the data in a database. As the computer systems receive each discrete value in the data series, they attach a timestamp and store the data together into a database.

At least two problems may arise in the management and/or analysis of such time-series data. A first issue relates to the accuracy of the timestamp in view of intrinsic lag times and drift. Specifically, as the timestamp may be used to generate a derivative value, the accuracy of a timestamp is just as important as the data value itself. However, it may be difficult to generate an accurate timestamp representing a moment in time when each data point was generated.

For example, some devices contain an internal clock generating a timestamp along with the data value. Other devices, however, contain only a simple sampling timer allowing generation of data values at the specified rate, without reference to an absolute time.

In the case of simple devices containing only sampling timers, the computer system responsible for capturing the data usually creates timestamps by looking at some reference clock (e.g. the computer system's own clock), when each data point is received. However, for a number of reasons, the computer system cannot simply use the current timestamp from the reference clock each time it receives a data point.

First, there exists an inherent lag between the time the data is generated by the device, and the time the data is received by the computer system. One example of such a time lag is the network delay. The unpredictable variation in the duration of this time lag precludes a simple solution to this problem, for example the subtraction of a fixed number of milliseconds for every data point.

Drift is a second reason that a computer system cannot simply use the current timestamp from the reference clock each time it receives a data point from a device containing only a sampling timer. Specifically, the clock of the device will generally exhibit an inherent degree of drift relative to the reference clock of the computer. For example, if the device is configured to report one data value per second, it may in fact report one data value every 0.998 seconds relative to the reference clock. Such drift can degrade the accuracy of the timestamp component of a time-series data.

A second problem which may arise in the management and/or analysis of time-series data, relates to the interval of sampling from multiple data sources. Specifically, data from multiple sources may be received at different intervals. FIG. 1 shows a simplified schematic diagram illustrating the flow of data from two different sensor devices. Sensor Device A may report data every second, while Sensor Device B reports data every 5 seconds. Even if two devices report data at the same interval, their data production may be out-of-synchronization (i.e. there may be a slight offset between them). This is shown in FIG. 2.

Given this potential lack of synchronization, it may prove difficult to produce a unified view of data values from all sources in order to fully represent the data extant at any one moment in time. FIGS. 3 and 4 show simplified schematic diagrams depicting creation of a unified view of data (the "combined report"), using data from the out-of-synchronization sources of FIG. 2. Without the unified view presented in FIGS. 3-4, it is difficult to answer relational questions regarding data acquired from different sources.

Many data collection systems simply write data points into a database in their raw form (i.e. with their originally assigned timestamps). Extra processing of the data is thus necessary in order to create the unified view. As shown in FIGS. 3 and 4, whenever such a unified view is to be constructed, data values may need to be shifted, interpolated, and/or duplicated in order to generate a unified table. For voluminous data sets and/or complex queries thereto, such processing can consume large amounts of time. In addition, such data processing would need to be reperformed for each query.

Accordingly, there is a need in the art for new approaches and techniques for managing timestamp data.

BRIEF SUMMARY OF THE INVENTION

Embodiments of methods and systems in accordance with the present invention relate to managing timestamps associated with received data. According to one embodiment, data is collected from a device that generates data at a specified rate, but which lacks a built-in clock. An accurate timestamp is assigned to the data by first taking an absolute timestamp from a reference clock, and then adding a calculated amount of time to each subsequent data point based on an estimate of the sampling frequency of the device. As the generated timestamp drifts from the actual reference clock time, the sampling frequency is re-estimated based on the amount of detected drift. According to another embodiment, data is collected from independent devices producing data at different rates. A series of common time intervals are generated, and a separate common timestamp is assigned to each data value based on the time interval in which it falls. Data for each time interval is written to a database using the common timestamp. Data for slower hardware devices may be duplicated or interpolated to generate a value associated with each data-producing device over all time intervals.

Various additional objects, features and advantages of the embodiments of the present invention can be more fully appreciated with reference to the detailed description and accompanying drawings that follow.

BRIEF DESCRIPTION OF THE DRAWINGS

FIG. 1 shows a simplified schematic view of data typically received from separate sources with different reporting frequencies.

FIG. 2 shows a simplified schematic view of data typically received from separate sources with the same reporting intervals.

FIG. 3 shows a simplified schematic view of an example of generating a unified view of data from a plurality of data sources that are out of synchronization with each other.

FIG. 4 shows a simplified schematic view of an example of generating a unified view of data from sources of different sampling frequencies, with values from slower data sources duplicated.

FIG. 10 shows an example of saved data using the Time-Series Data Agent.

DETAILED DESCRIPTION OF THE INVENTION

Figure 5:
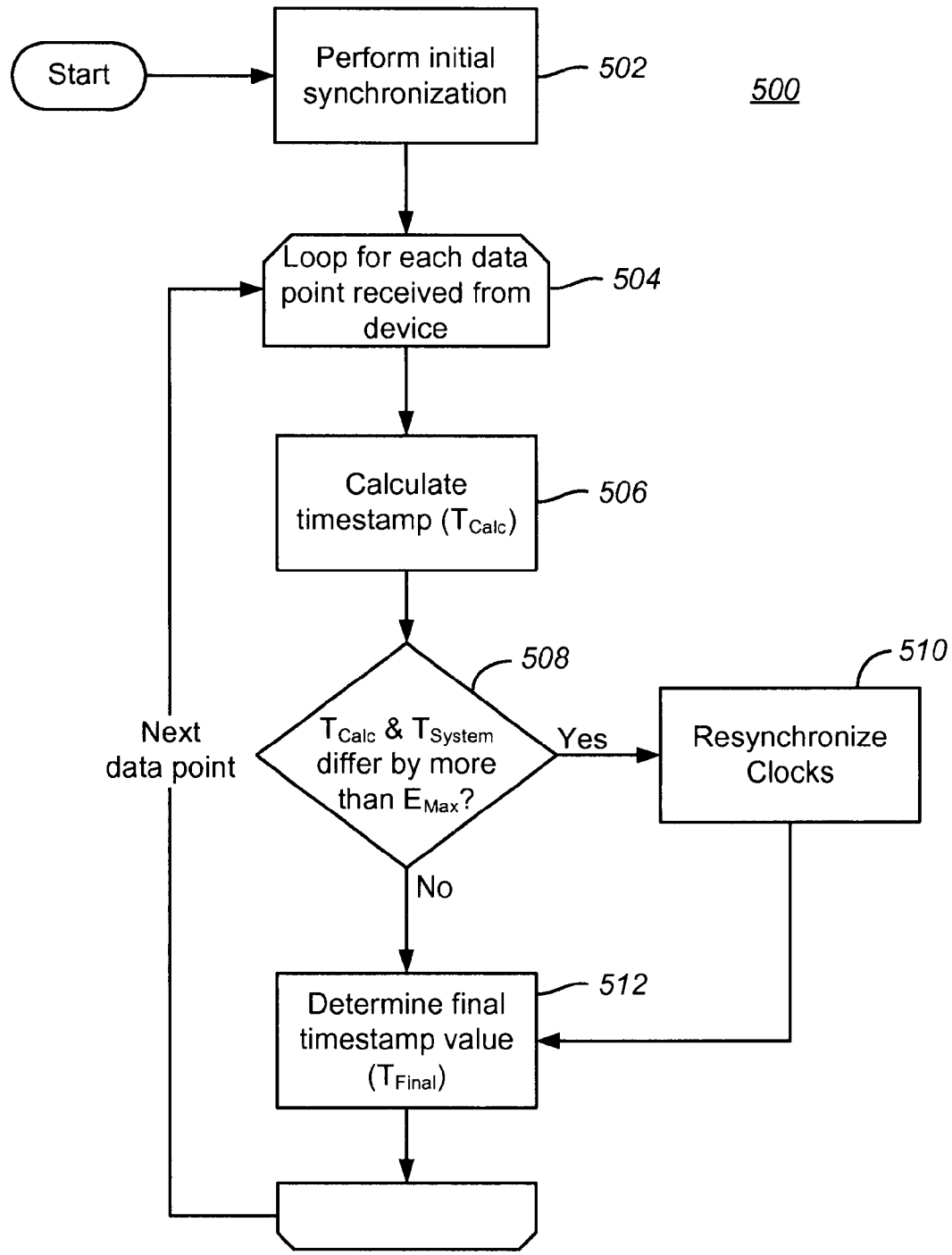
FIG. 5 shows a process flow for assigning the timestamp component to data received.

Embodiments in accordance with the present invention relate generally to computer systems and computer-implemented methods that collect and save streams of time-series data from one or more sources, using this data for process control. While embodiments in accordance with the present invention are described below in connection with the control of semiconductor processing tools, the present invention is not limited to this particular application.

Embodiments of methods and systems in accordance with the present invention relate to managing timestamps associated with received data. According to one embodiment, data is collected from a device that generates data at a specified rate, but which lacks a built-in clock. An accurate timestamp is assigned to the data by first taking an absolute timestamp from a reference clock, and then adding a calculated amount of time to each subsequent data point based on an estimate of the sampling frequency of the device. As the generated timestamp drifts from the actual reference clock time, the sampling frequency is re-estimated based on the amount of detected drift. According to another embodiment, data is collected from independent devices which produce data at different rates. A series of common time intervals are generated, and a separate common timestamp is assigned to each data value based upon the time interval into which it falls. Data for each time interval is written to a database using the common timestamp. Data for slower hardware devices may be duplicated or interpolated to generate a value associated with each data producing device over all time intervals.

Tagging Data with an Accurate Timestamp

In order to address issues relating to lag time and drift between a data-producing device and the reference clock of a computer system, embodiments in accordance with the present invention calculate the timestamp by initially taking the current time from the reference clock, and then subsequently adding a calculated amount of time to the previous timestamp. The amount of time to be added is calculated based upon the clock speed of the device and the number of clock ticks that have elapsed since the last sample. Embodiments in accordance with the present invention track drift in the device clock versus the reference clock, adjusting timestamps generated accordingly. Embodiments in accordance with the present invention may also synchronize back to the current reference clock time upon an event or trigger, such as if a significant drift is detected, or if an external application notifies the system that it is safe to resynchronize.

Embodiments in accordance with the present invention include a mechanism to accurately tag a timestamp to a data point given an unknown drift of a device clock, and an inconsistent delay between the device and the computer system responsible for storing the data. Such embodiments utilize at least two main concepts. First, a device can be configured to report data at a fixed frequency (e.g. every 10 milliseconds), and then assume that this reporting is fairly accurate based upon the relatively tight performance specifications for temperature controlled clocks over limited temperature ranges. Second, drift in the device clock relative to the reference clock can be detected, and the timestamps generated may be adjusted to account for this drift.

FIG. 5 is a simplified flow diagram illustrating shown method 500 of how timestamps are calculated for each point of data. Step 502 shows the initial synchronization. When the computer program starts up and processes the first point of data from the device, it defines and initializes the following variables:

TReference=<current reference clock time>
TReference is the current time as reported by the reference clock TLag=<fixed configuration constant>
TLag is the estimated average lag between the time that a data point is generated by the device and the time that is received by the computer system. Knowing this value helps to create a more accurate absolute timestamp value for each data point. Such network delay can be determined by having the data-producing device send a signal to the computer system, and then having the computer system return a signal to the device, thereby allowing calculation of the round trip delay. TLag can also be measured each time data is retrieved from the device by measuring the round-trip delay and dividing by a factor of 2, so that it is neither constant nor zero. If TLag is not known, then it can be set to zero.

TCalc=TReference
TCalc is the calculated timestamp for the data point being processed before accounting for TLag. When the clocks are first synchronized, TCalc is set to be the same as TReference.

TLastSynch=TReference
The TLastSynch variable represents the time when the calculated device clock was last synchronized with the reference clock.

EDevice=0

EDevice represents the calculated drift between the hardware device clock and the reference clock. Initially, it is assumed that there is no drift, and then the value of EDevice is adjusted as drift is detected.

EMax=<fixed configuration constant>

EMax represents the maximum difference that is tolerated between TCalc and TReference before a resynchronization is performed.

Beginning with step 504, the timestamp is subject to ongoing calculation. Step 504 shows the beginning of a loop for each data point received from the sensing device.

Step 506 shows the ongoing timestamp calculation. Specifically, as the computer program processes each subsequent data point, it calculates the next value of TCalc by adding to the previous value.

$$TCalc=TCalc+(\Delta TDevice/FDevice)(1+EDevice).$$

FDevice is the frequency of the device clock. Some devices contain a clock with a constant frequency, while other devices contain a clock that varies depending on the configured sampling rate.

$\Delta$TDevice is the number of clock ticks that have elapsed on the device clock since the last data point. For some devices having a constant clock frequency, the difference is sometimes reported directly along with the data value. At other times, a cumulative counter is reported with each data point. This counter states the total number of clock ticks that have elapsed. In this case $\Delta$TDevice can be calculated by taking the difference between the current and previous counter values. For example, if the clock frequency is 1 kHz (1000 ticks per second) and the counter values are 10032 and 10054 for two consecutive data points respectively, then:

$$\Delta TDevice/FDevice=(10054-10032)/1000=0.022 \text{ seconds}$$

For devices lacking independent clocks or other devices, $\Delta$TDevice can be assumed to be 1 for each data sample, while FDevice is the rate of data collection. For example, if 4 values are collected per second, then:

$$\Delta TDevice/FDevice=\frac{1}{4}=0.250 \text{ seconds}$$

The time to add to the previous timestamp is adjusted by the amount EDevice, which is recalculated during each clock resynchronization.

Steps 508 and 510 of process flow 500 show clock resynchronization. Specifically, in step 508, a determination is made whether |TCalc−TReference|>EMax for any data point. If this condition is satisfied, then in step 510 the computer program assumes that there has been a significant drift in the device clock relative to the reference clock.

The computer system then resynchronizes the two clocks as follows:

TCalc=TReference

This uses the reference time as the timestamp for the current data point.

EDevice=EDevice+(TCalc−TReference)/(TReference−TLastSynch)

This adjusts the estimated average drift by calculating the average drift of TCalc versus the reference clock since the last resynchronization.

TLastSynch=TReference

This notes when the resynchronization took place. After EDevice is recalculated, all subsequent calculations of TCalc will account for the average drift of the device clock.

Step 512 of process flow 500 shows final assignment of the timestamp. Specifically, after TCalc is calculated, it is adjusted by the fixed estimated average lag to come up with the final timestamp to assign to the data point:

TFinal=TCalc+TLag

TFinal is the final timestamp that is assigned to the current data point

The approach just described assumes EDevice=0 when data is first begun to be processed. Accordingly, a resynchronization would likely occur soon thereafter, as the device clock almost certainly exhibits a noticeable drift relative to the computer clock.

Each time a resynchronization occurs, the value of EDevice is further refined. As time goes on, EDevice would tend to approach some value representing the true drift between the clocks, and resynchronization events would become less and less frequent. If the device clock were to speed up or slow down, the resynchronization actions would account for this.

Embodiments in accordance with the present invention are not limited to the particular examples illustrated, and alternative embodiments could utilize different steps or steps performed in a different order. For example, while the embodiment illustrated in FIG. 5 shows resynchronization triggered based upon satisfaction of the condition |TCalc−TReference|>EMax, this is not required by the present invention. In accordance with alternative embodiments, resynchronization could be based upon execution of a trigger from an external application indicating that it is safe to resynchronize.

Saving Data with Common Timestamp

In order to address issues relating to lack of synchronization between multiple data sources, embodiments in accordance with the present invention generate a separate common timestamp for all data received from multiple devices. This data is saved to the database at its own frequency, regardless of the frequency at which the device actually collects data. In essence, these embodiments in accordance with the present invention continuously save the "current view of the world" at a particular frequency, as opposed to saving individual data points.

Such embodiments of methods in accordance with the present invention include a computer program called the Time-Series Data Agent, which will ensure that all time-series data written to the database has a synchronized common timestamp for reporting purposes. The Time-Series Data Agent works by accepting data values from time-series data sources and then writing them to the database at a constant periodic interval.

Figure 6:
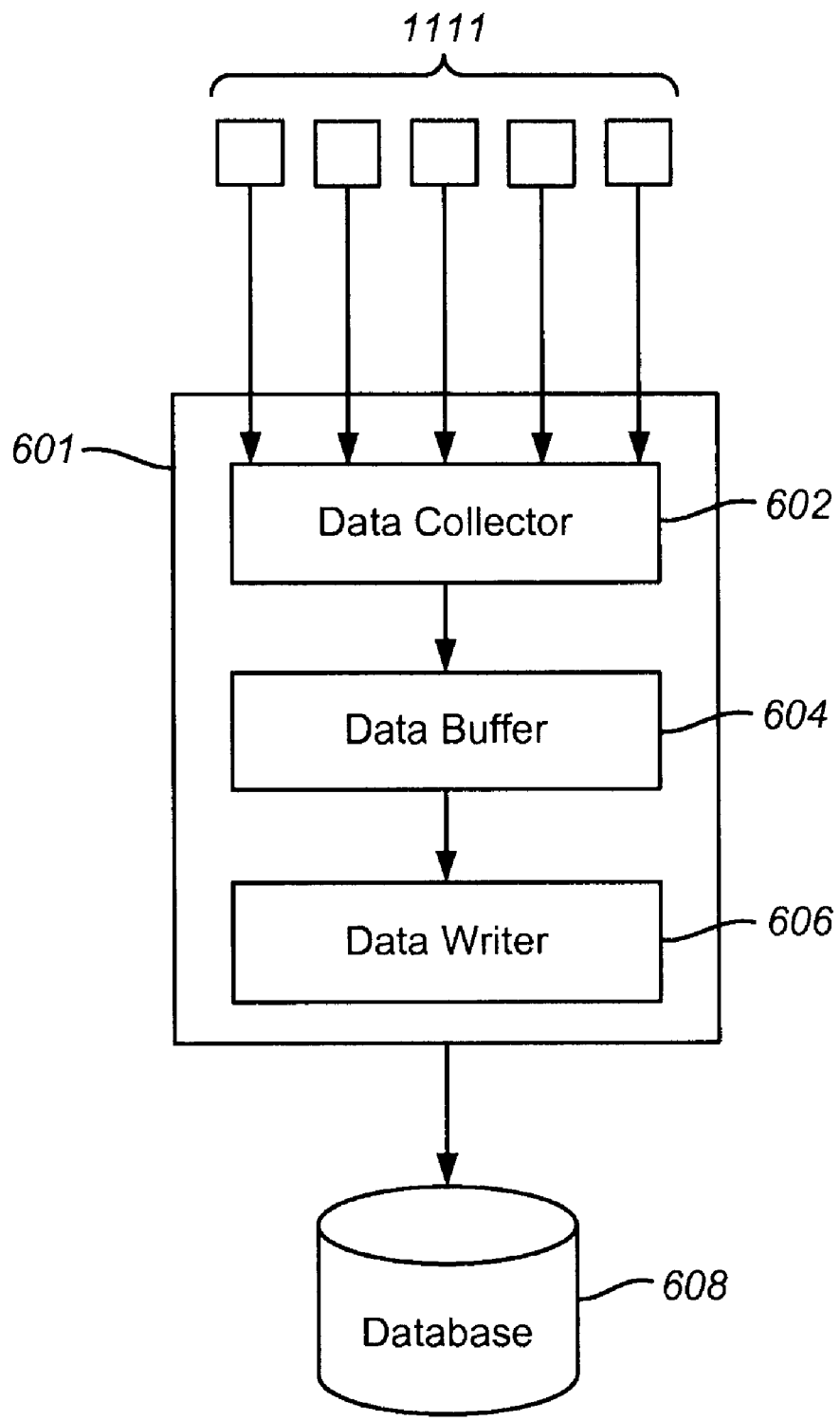
FIG. 6 shows a simplified schematic view of the architecture of the Time-Series Data Agent.
Figure 6A:
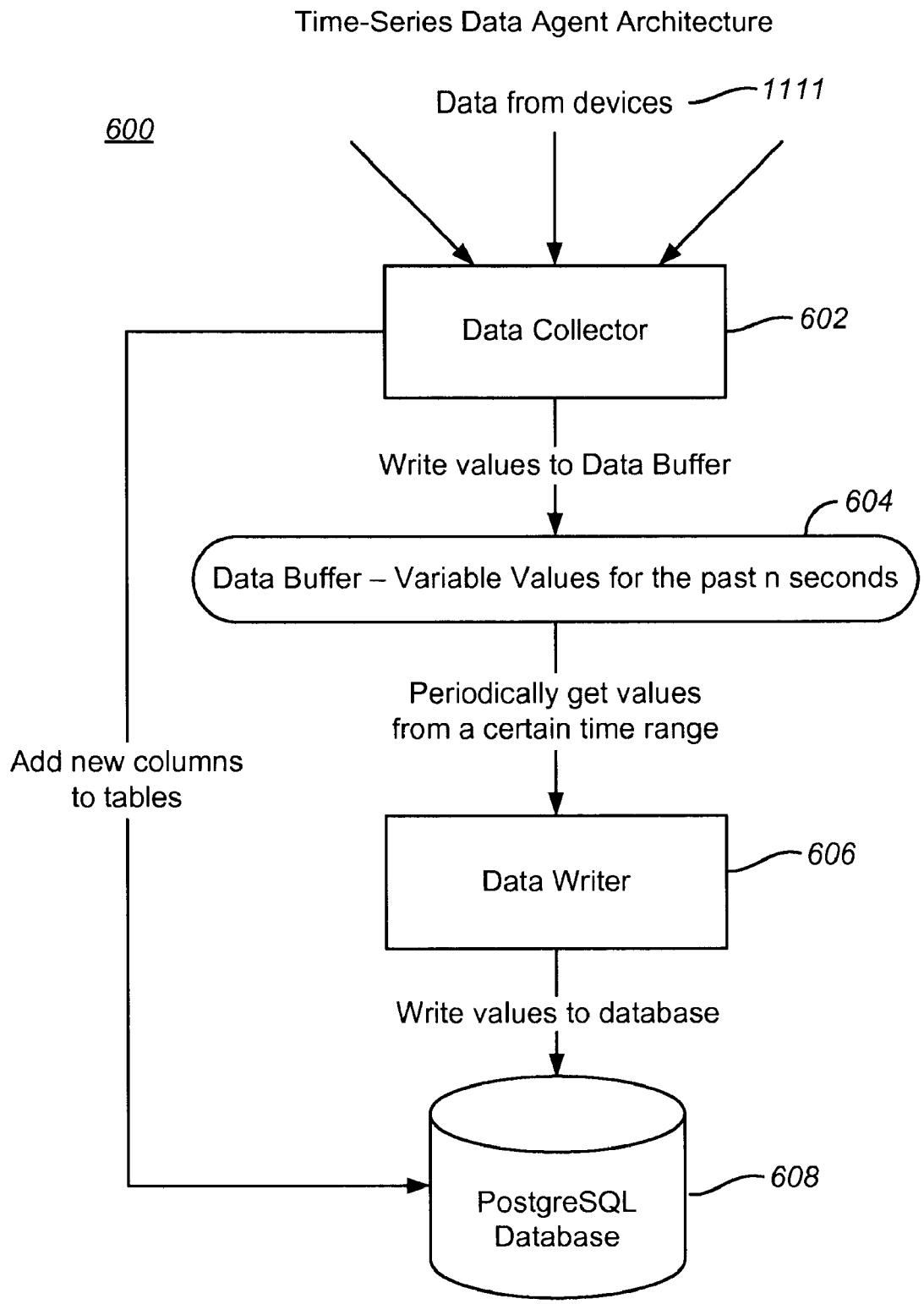
FIG. 6A shows a simplified schematic flow diagram of the operation of the Time-Series Data Agent of FIG. 6.

FIG. 6 illustrates a simplified schematic view of the general architecture of one embodiment of a Time-Series Data Agent in accordance with the present invention. FIG. 6A shows a simplified schematic diagram of the flow 600 operation of the embodiment of the Time-Series Data Agent of FIG. 6.

FIG. 6 shows the following three main components of the Time-Series Data Agent 601: Data Collector 602, Data Buffer 604, and Data Writer 606. Data Buffer 604 stores the variable values received from applications over the past few seconds. This buffer 604 gives the data-providing devices extra time to send their data to the Time-Series Data Agent (see description of the Data Writer below for more details). Data Buffer 604 also allows data values to build up if the Data Writer falls behind while saving records to the database 608.

Figure 7:
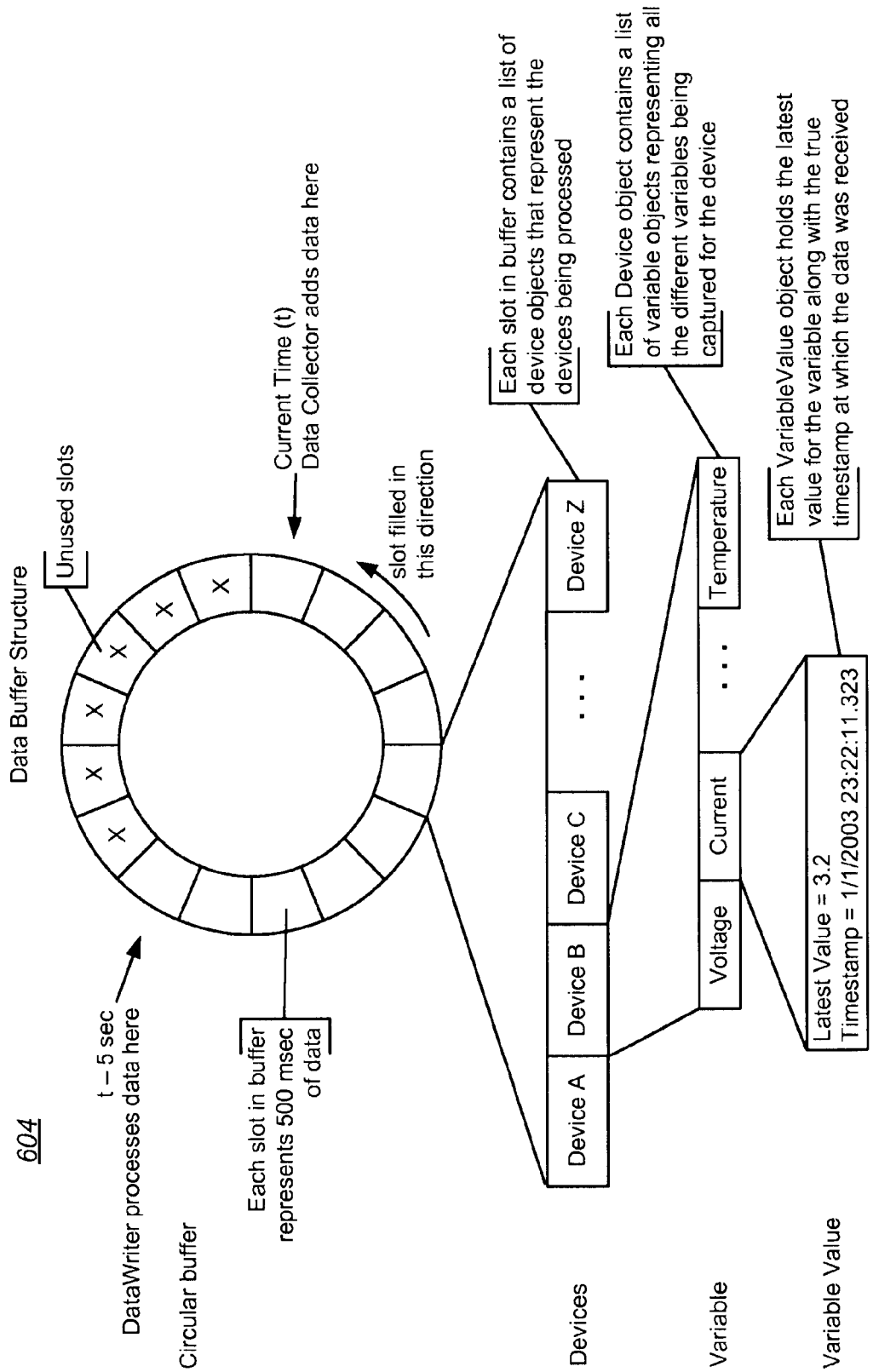
FIG. 7 shows a simplified schematic view of the structure of the Data Buffer.

FIG. 7 shows the structure of one possible embodiment of the Data Buffer 604. In this example, Data Buffer 604 is essentially a circular buffer of data structures holding individual values for each data point for each device. Each data structure in the buffer holds all the data for a particular time range.

Figure 8:
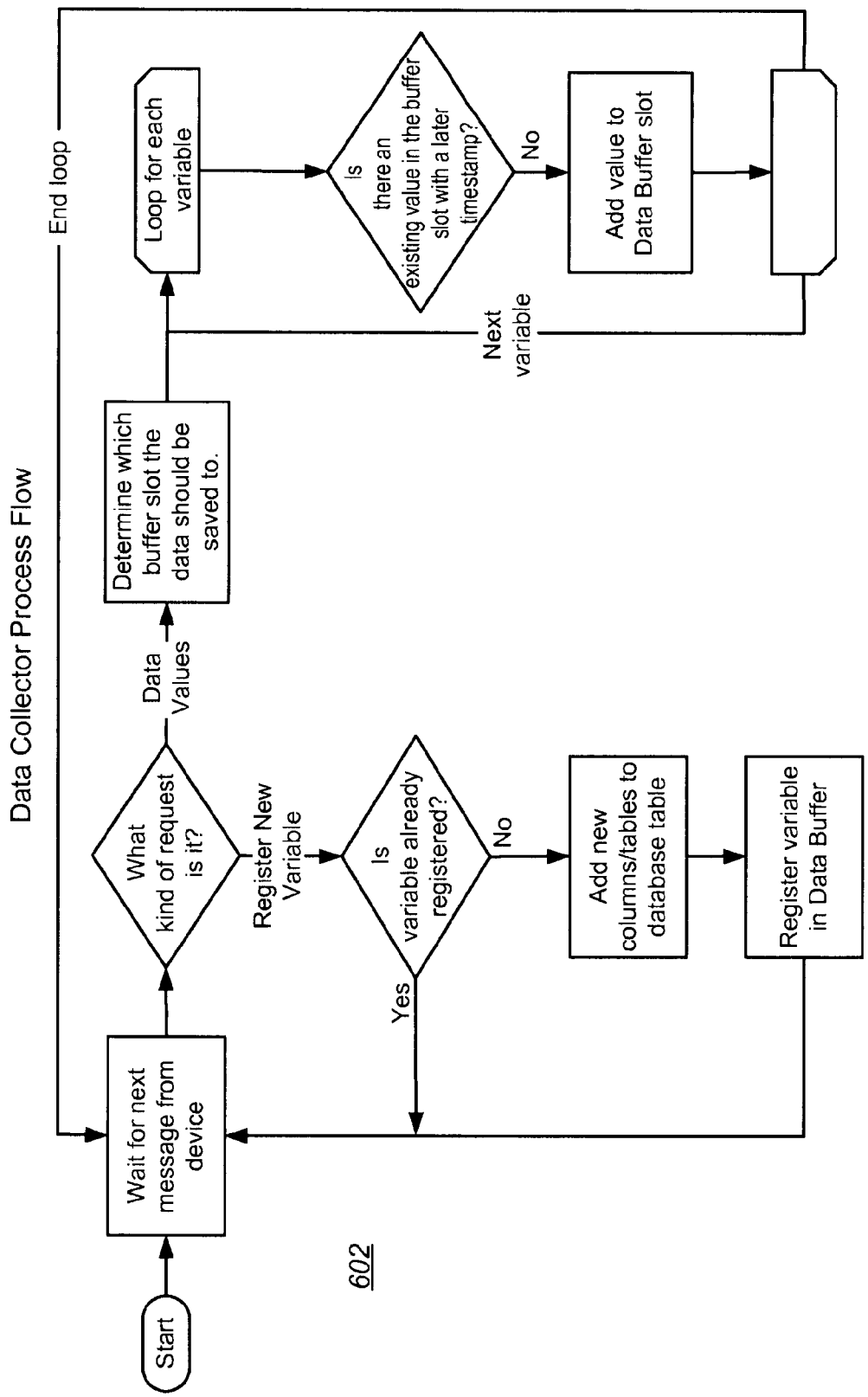
FIG. 8 shows a simplified schematic view of the process flow for the Data Collector.

FIG. 8 illustrates the general process flow for operation of one particular embodiment of a Data Collector in accordance with the present invention. In this example, Data Collector 602 listens for data from the data-producing devices, and is configured to perform at least two functions. Data Collector 602 registers new data variables with the database and creates new database tables/columns as necessary. In addition, for each data point, the Data Collector 602 writes the values into the Data Buffer 604 according to the timestamp at which it was received.

Figure 9:
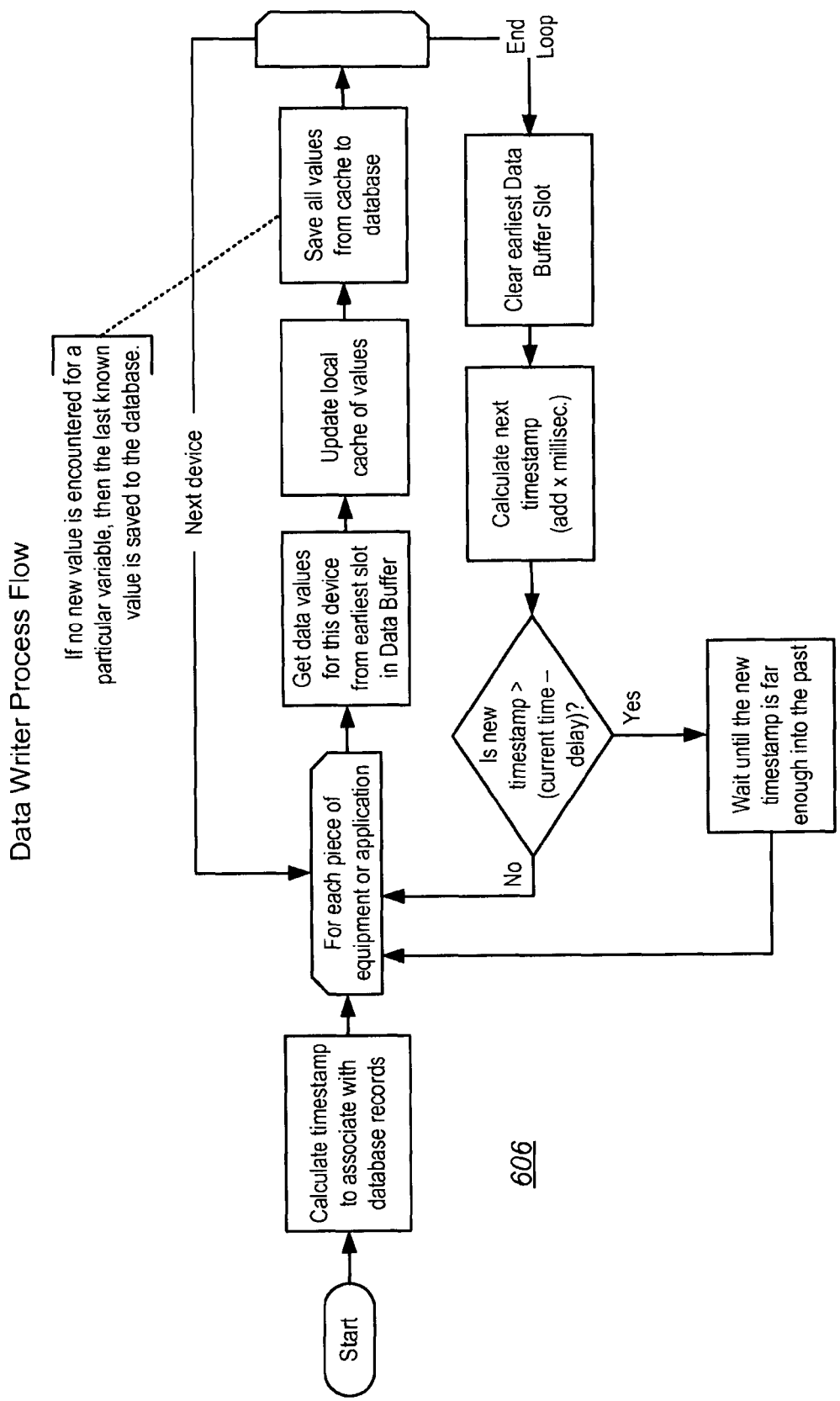
FIG. 9 shows a process flow for the Data Writer.

FIG. 9 is a simplified flow diagram showing operation of one particular embodiment of the Data Writer. In this example, Data Writer 606 periodically checks the Data Buffer 604 and retrieves the values for each variable for the next time interval. In one example, the Data Buffer will get the values for the next 500 milliseconds. The Data Buffer updates a local cache with all the latest values and then writes all data values to the database.

Data Writer 606 is configured to write data at an independently determined frequency that is at least as fast as the rate of the fastest device. Data Writer 606 writes a value for all variables into the database during each iteration, even if there has been no updated value sent from the device. If a particular device reports faster than this frequency, then intermediate values are lost.

Even though a common timestamp is generated for all data, the true timestamp representing the time at which the data was generated, can also be saved. This may be important where the data-producing device includes a clock that is able to provide a true timestamp.

FIG. 10 shows a sample of data saved to the database by the Time-Series Data Agent. The original timestamp for each data point is preserved, but a separate, common timestamp is also generated to match up the two series of data. Data for Device B is duplicated as it is generated at half the frequency of Device A. Data in the database is stored in the same manner as it is displayed, so no recalculation/reprocessing need be performed in order to answer relational queries such as those previously listed.

Some hardware devices may have an inherent lag between the time that data is generated and the time that the data is received by the Time-Series Data Agent. Since this lag may be arbitrarily large, the Data Writer element can be configured to process data only up to a particular number of milliseconds before the current time. This allows the device to report its data values slightly late without the Data Writer having already written the particular time period's values to the database.

The size of the Data Buffer may also be configured to a larger time range to allow the Data Writer to lag behind the current time. The Data Writer would lag behind the current time in the instance just mentioned, but could also lag behind in the case where the database is slow to respond to save requests.

While the illustrated embodiments show that the Time-Series Data Agent saves the most recently reported device value at any given common timestamp, the present invention is not limited to this approach. In accordance with alternative embodiments, the Time-Series Data Agent may instead save the device value that has a timestamp closest to the current common timestamp, even if the data timestamp falls after the common timestamp. In accordance with such embodiments, the Time-Series Data Agent would wait until it receives the next point of data from the device before writing previous values to the database.

While the illustrated embodiments show the Time-Series Data Agent as simply duplicating the previously known value from a slower device if no new value is received, the present invention is not limited to this approach. In accordance with alternative embodiments, the Time-Series Data Agent may instead be configured to interpolate between the previous data point and the next data point. In accordance with such embodiments, the Time-Series Data Agent would wait until it received the next point of data from the device before writing previous values to the database. The Time-Series Data Agent may also have an option not to write any value into the database for a slower device if desired, thereby conserving online storage space. Further alternatively, the Time-Series Data Agent may decimate (i.e., discard samples), in order to achieve a uniform final sampling rate.

The storage scheme used by this invention results in data that is highly compressible. Embodiments in accordance with the present invention may include a separate computer program that archives older data at a predefined interval, and compresses the accumulated older data into a set of offline files to preserve storage space. The amount of data to be kept online in the database can be configured as desired, and as storage space allows, by specifying either a maximum time range to keep online or a minimum amount of free space to keep available.

In many database systems, performing multiple record insertions in a single transaction yields higher performance and individual insertions. Time-Series Data Agents in accordance with embodiments of the present invention contain a feature wherein multiple records of data (all records for each time interval or for multiple time intervals) are inserted together in a single database transaction and then committed afterwards.

Figure 11:
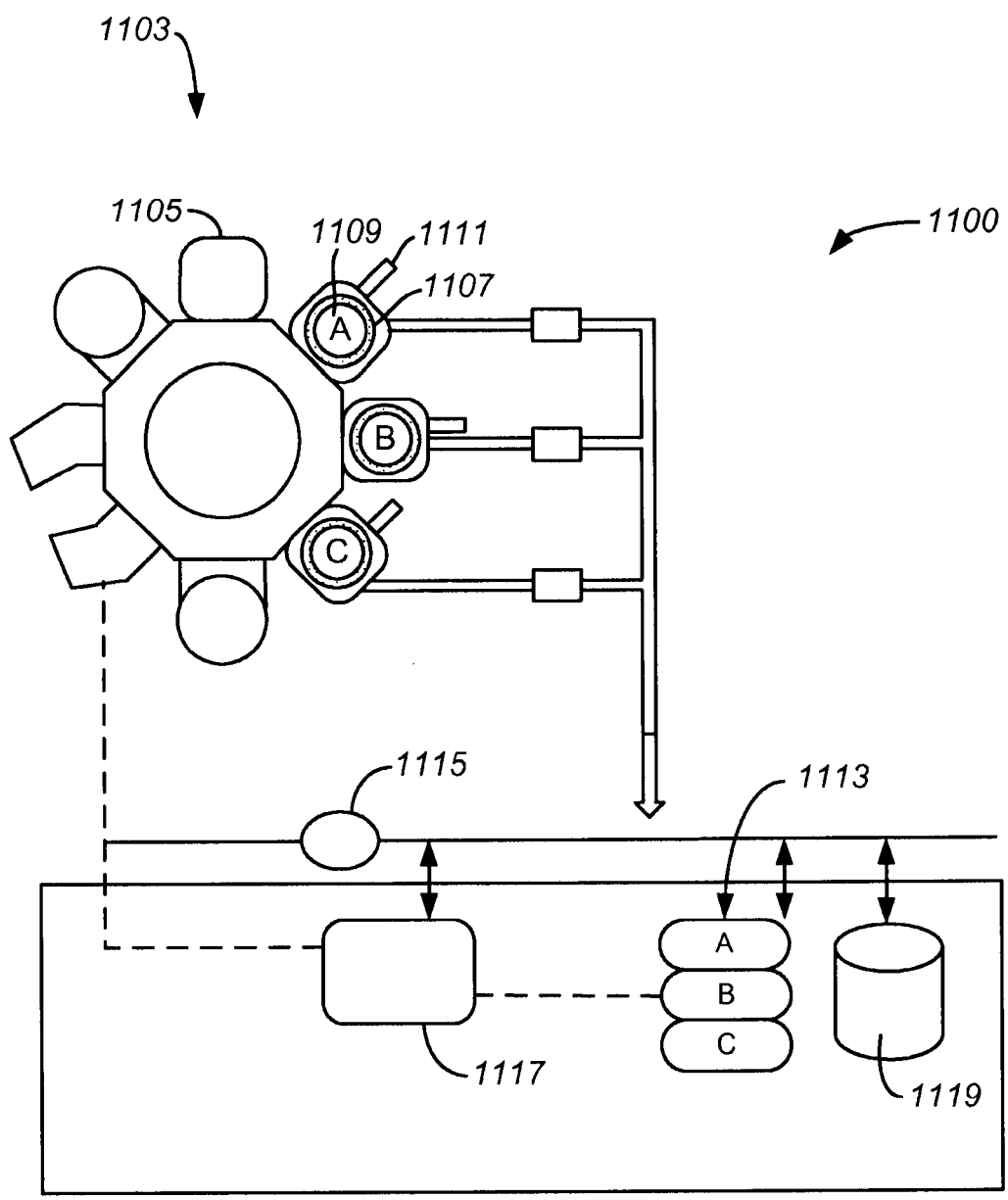
FIG. 11 is a simplified diagram illustrating a system for processing semiconductor devices according to an embodiment of the present invention.

Embodiments of methods and systems in accordance with the present invention are particularly suited for managing the collection of data received from a semiconductor processing tool. FIG. 11 is a simplified diagram illustrating a system 1100 for processing semiconductor devices according to an embodiment of the present invention. The diagram is merely an illustration, which should not unduly limit the scope of the claims herein. One of ordinary skill in the art would recognize many other variations, modifications, and alternatives.

As shown, system 1100 includes a process tool 1103. As merely an example, the process tool can include a dry etch tool using a plasma environment such as those manufactured by Tokyo Electric Limited of Tokyo, Japan, but can be others. Multiple process chambers 1105 are coupled to the process tool. Each of the process chambers include elements such as permanent magnets, an RF power supply and matching network to provide a plasma environment for an etching process, but can be others.

Each of the process chambers also includes a susceptor 1107 to hold a semiconductor wafer 1109 to be processed. The susceptor can be an electrostatic chuck or a vacuum chuck among others. The semiconductor wafer has a film, such as a dielectric film, deposited thereon. The dielectric film can be silicon oxide, silicon nitride, silicon oxynitride or a combination.

Each of the chambers also includes one or more sensor devices 1111 operably coupled to the chamber, also shown in FIG. 11. The one or more sensors can include, but are not limited to, a RF sensor, an optical sensor, a mass spectrometer, a temperature probe, or an analog-to-digital signal converter, among others. The one or more sensors are configured to collect information associated with the plasma environment in the etch tool during a determined time period. The chamber maintains the plasma environment during the determined time period. The information is characterized by a first signal intensity. In certain embodiments, the sensor device is configured to collect information on the RF signal in the chamber, but can be others. These other information includes certain light intensity, temperature, pressure, or gas composition, among others.

The system also includes a process module 1113 coupled to the sensor devices in each of the process chambers. The process module includes elements such as a computer device and computer codes to receive data such as time-series data streams from the sensors, and to manage/generate timestamp information as indicated above.

As shown in FIG. 11, the system further includes a network interface 1115 to connect the process module to a database or a data storage 1119. The network interface may include communication standards such as a semiconductor equipment control system (SECS/GEM or SECS II/GEM or HSMS). The database can be part of the fabrication facility network and connect to other tools or computers.

Once data has been stored together with timestamp information in accordance with embodiments of the present invention, the collected data may be utilized to perform any number of tasks in connection with process control or other objectives. For example, in the context of semiconductor processing, collected time series data reflecting one or more operational parameters of a tool may be displayed to an operator to allow monitoring of the health of the tool/recipe. The time-series data may alternatively be analyzed to alert an operator to the likelihood of a fault. Such fault analysis may involve comparing the collected data to historical data for the tool, or to a predetermined set of rules defining acceptable tolerance variation of tool parameters for a particular process. Where a fault is indicated by this analysis, the operator may be alerted to allow for alteration of inputs to the tool or to shut down the tool. In other embodiments, the semiconductor processing tool may automatically be shut down where analysis reveals the possibility of a fault occurring. In accordance with still other embodiments, the collected time series data including the generated timestamp may be used for recipe control to vary inputs to the tool and thereby bring the manufacturing process back within a specified tolerance window.

Data collected and stored in accordance with embodiments of the present invention may also be used for other purposes, for example to determine process endpoint. In accordance with such an embodiment, the collected data may be analyzed to indicate the completion of a fabrication process. Again, the collected data may be compared with historical data, or with a set of rules governing the endpoint of the process. The tool operator may simply be alerted to the existence of endpoint, or tool operation may be automatically halted once analysis of the collected data indicates that endpoint has been reached.

Data collected and stored in accordance with embodiments of the present invention may be used in connection with still other purposes. For example, the collected data may be fed forward to another tool/chamber employed in a subsequent step to process the wafer, alerting that other tool/chamber to the parameters of the subsequent processing. For example, collected data revealing the actual thickness of a layer formed by chemical vapor deposition (CVD) in one tool or chamber, could in turn be fed forward to a subsequent tool or chamber utilized in removing the deposited material, for example by etching or chemical mechanical planarization (CMP).

Conversely, data collected in accordance with embodiments of the present invention may be fed back to another tool/chamber employed in a previous step to process the wafer, alerting that tool/chamber to issues associated with the previous processing. For example, data collected from a tool responsible for removing a layer of material (i.e. an etching or CMP tool) indicating the actual thickness of the material removed, could be fed back to the tool previously responsible for forming the material layer, to indicate whether the layer as-deposited actually exhibited the predicted thickness. Such information could in turn be used to adjust the parameters of the deposition process.

For many of the potential uses listed above (i.e. fault detection, endpointing, recipe control, and data feed forward/feedback), the time accuracy of the sampled data is critical. This is because the data, or derivatives thereof, may be used for curve fitting or processing by various algorithms highly dependent upon the accuracy of the time of data sampling. By ensuring an accurate timestamp, embodiments in accordance with the present invention ensure the suitability of the collected data for one of more of these prescribed uses, and others.

Figure 12:
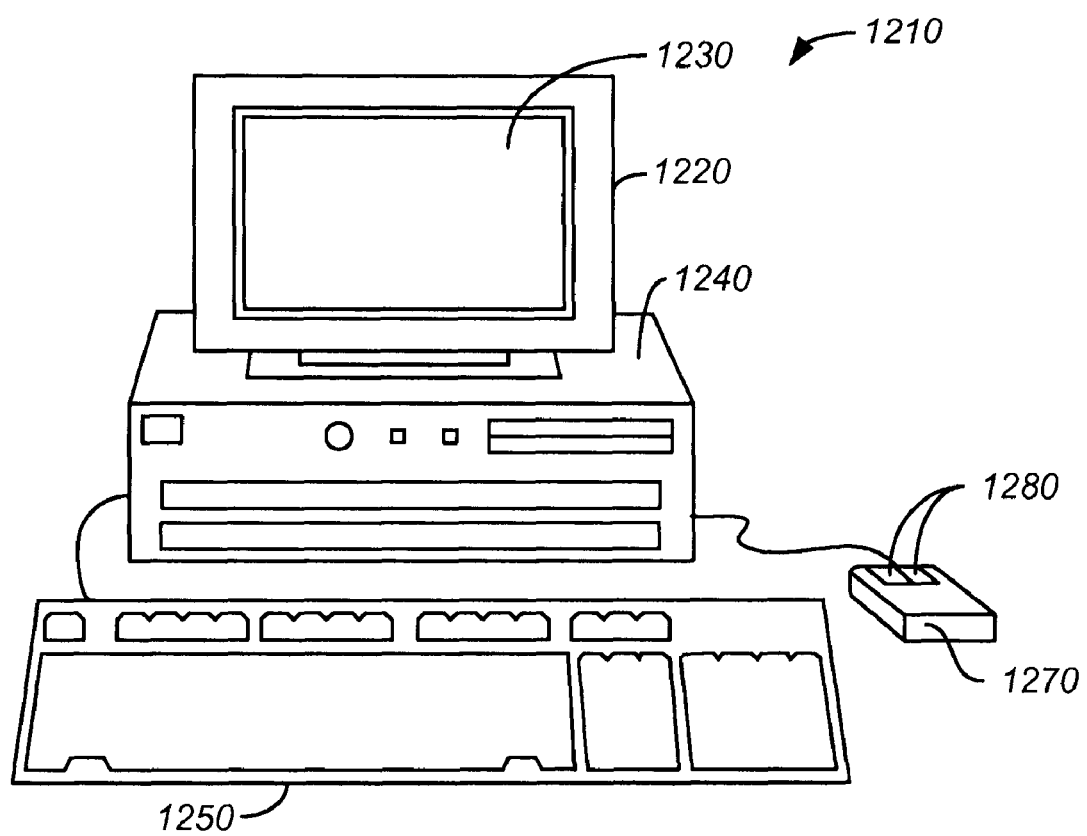
FIG. 12 is a schematic illustration of a computer system for use in accordance with embodiments of the present invention.

FIG. 12 shows computer system 1210 including display device 1220, display screen 1230, cabinet 1240, keyboard 1250, and mouse 1270. Mouse 1270 and keyboard 1250 are representative "user input devices." Mouse 1270 includes buttons 1280 for selection of buttons on a graphical user interface device. Other examples of user input devices are a touch screen, light pen, track ball, data glove, microphone, and so forth. FIG. 12 is representative of but one type of system for embodying the present invention. It will be readily apparent to one of ordinary skill in the art that many system types and configurations are suitable for use in conjunction with the present invention. In a preferred embodiment, computer system 1210 includes a Pentium class based computer, running Windows NT operating system by Microsoft Corporation. However, the apparatus is easily adapted to other operating systems and architectures by those of ordinary skill in the art without departing from the scope of the present invention.

As noted, mouse 1270 can have one or more buttons such as buttons 1280. Cabinet 1240 houses familiar computer components such as disk drives, a processor, storage device, etc. Storage devices include, but are not limited to, disk drives, magnetic tape, solid state memory, bubble memory, etc. Cabinet 1240 can include additional hardware such as input/output (I/O) interface cards for connecting computer system 1210 to external devices external storage, other computers or additional peripherals, further described below.

Figure 12A:
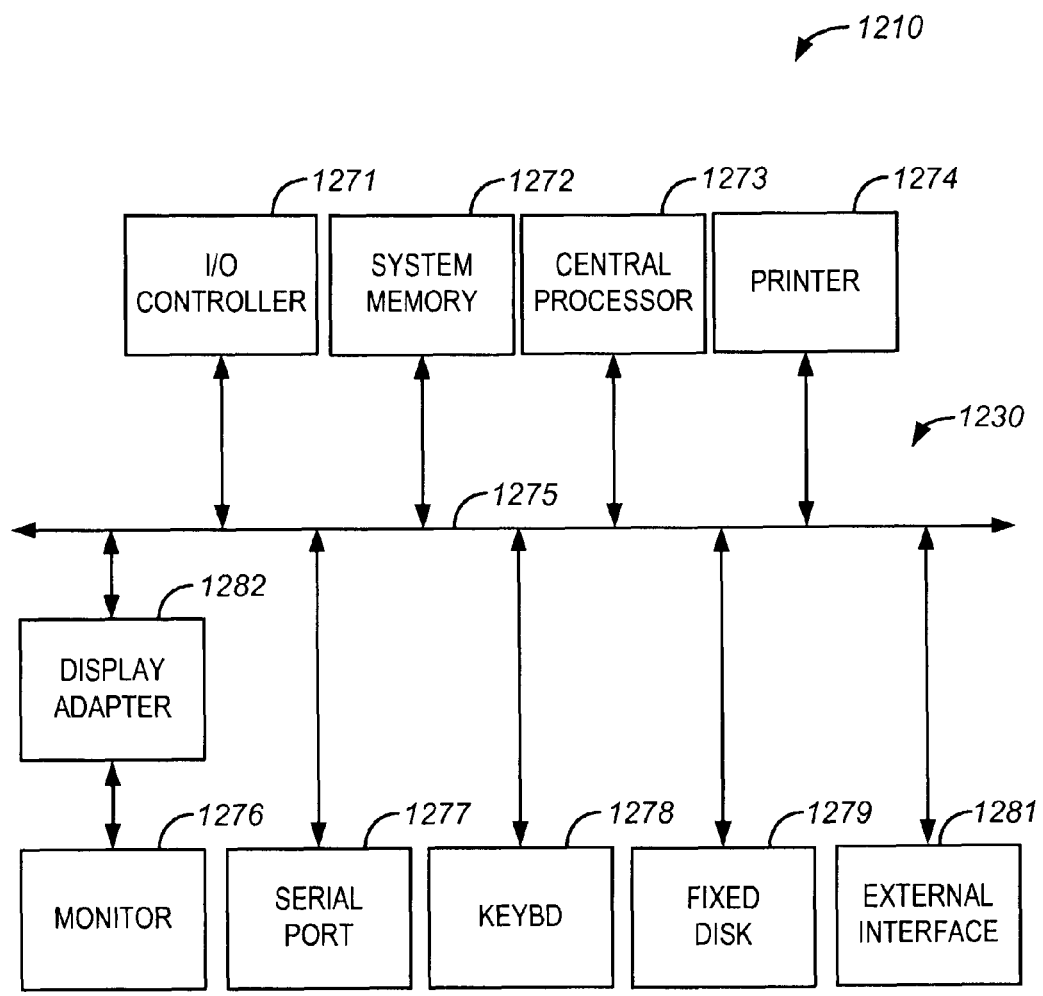
FIG. 12A is an illustration of basic subsystems the computer system of FIG. 12.

FIG. 12A is an illustration of basic subsystems in computer system 1210 of FIG. 12. This diagram is merely an illustration and should not limit the scope of the claims herein. One of ordinary skill in the art will recognize other variations, modifications, and alternatives. In certain embodiments, the subsystems are interconnected via a system bus 1275. Additional subsystems such as a printer 1274, keyboard 1278, fixed disk 1279, monitor 1276, which is coupled to display adapter 1282, and others are shown. Peripherals and input/output (I/O) devices, which couple to I/O controller 1271, can be connected to the computer system by any number of means known in the art, such as serial port 1277. For example, serial port 1277 can be used to connect the computer system to a modem 1281, which in turn connects to a wide area network such as the Internet, a mouse input device, or a scanner. The interconnection via system bus allows central processor 1273 to communicate with each subsystem and to control the execution of instructions from system memory 1272 or the fixed disk 1279, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD- ROMS and bar codes, and semiconductor memories such as flash memory, read-only-memories (ROM), and battery backed memory.

Embodiments in accordance with the present invention are not limited to methods and computer programs for managing timestamp information relating to the processing of silicon wafers. In accordance with alternative embodiments, endpoint can be determined for processes utilized in the fabrication of flat panel displays, microelectromechanical structures (MEMS) and other devices.

It is also understood that the examples and embodiments described herein are for illustrative purposes only and that various modifications or changes in light thereof will be suggested to persons skilled in the art and are to be included within the spirit and purview of this application and scope of the appended claims

What is claimed is:

1. A method for calculating timestamps, the method comprising:
    receiving, to a data management system including at least one processor, a first data point from a data source device configured to detect a condition of a processing chamber;
    reading a time from a reference clock to generate, using the data management system, a first timestamp for the first data point, the reference clock being separate from the data source device;
    storing the first timestamp and the first data point in a non-transitory computer readable storage medium;
    receiving a second data point from the data source device to the data management system;
    calculating, using the data management system, a second timestamp for the second data point by adding a computed value to the first timestamp, generated using the time from the reference clock, wherein the computed value represents an amount of time based at least in part upon a number of clock ticks of a clock of the data source device transpiring between measurement of the first data point and measurement of the second data point, each clock tick of the clock of the data source being determined to correspond to a period of time; and
    storing the second timestamp and the second data point in the non-transitory computer readable storage medium.

2. The method of claim 1 wherein the amount of time is based at least in part upon an estimate of a drift between the clock of the data source device and the reference clock.

3. The method of claim 2 further comprising:
    comparing at least one calculated timestamp against the reference clock to determine if the drift estimate is to be recalculated; and
    if the drift estimate is to be recalculated, adjusting the drift estimate by,
    determining a difference between the at least one calculated timestamp and the reference clock, and
    dividing the difference by a time transpired since a last adjustment.

4. The method of claim 1 further comprising adding an estimated adjustment value to the first timestamp to determine the second timestamp to assign to the second data point, wherein the estimated adjustment value is different from the computed value.

5. The method of claim 4 wherein the estimated adjustment value accounts for a lag between a first time that the data value is generated and a second time that the data value is received.

6. The method of claim 5 wherein the estimated adjustment value is a configurable value, or is estimated by measuring round-trip delay.

7. The method of claim 1 further comprising resetting the timestamp to the reference clock.

8. The method of claim 7 wherein the timestamp is reset to the reference clock when a calculated condition is satisfied.

9. The method of claim 7 wherein the timestamp is reset to the reference clock based upon an external trigger.

10. A computer program product stored on a non-transitory computer-readable medium for calculating timestamps, the computer program product comprising:
    code for receiving, to a data management system including at least one processor, a first data point from a data source device configured to detect a condition of a processing chamber;
    code for reading a time from a reference clock to generate, using the data management system, a first timestamp for the first data point, the reference clock being separate from the data source device;
    code for storing the first timestamp and the first data point in a non-transitory computer readable storage medium;
    code for receiving a second data point from the data source device to the data management system;
    code for calculating, using the data management system, a second timestamp for the second data point by adding a computed value to the first timestamp, generated using the time from the reference clock, wherein the computed value represents an amount of time based at least in part upon a number of clock ticks of a clock of the data source device transpiring between measurement of the first data point and measurement of the second data point, each clock tick of the clock of the data source being determined to correspond to a period of time; and
    code for storing the second timestamp and the second data point in the non-transitory computer readable storage medium.

11. The computer program product according to claim 10 wherein the amount of time is based at least in part upon an estimate of a drift between the clock of the data source device and the reference clock.

12. The computer program product according to claim 11 further comprising:
    code for comparing at least one calculated timestamp against the reference clock to determine if the drift estimate is to be recalculated; and
    if the drift estimate is to be recalculated, adjusting the drift estimate by,
    code for determining a difference between the at least one calculated timestamp and the reference clock, and
    code for dividing the difference by a time transpired since a last adjustment.

13. A system for calculating timestamps, the system comprising:
    at least one data source device configured to detect conditions of a processing chamber;
    at least one reference clock configured to provide time;
    a memory configured to store data points and timestamps; and
    a processor operatively coupled to the memory, the at least one data source device, and the at least one reference clock, the at least one processor configured to:
    receive a first data point from the at least one data source device;
    read a time from the at least one reference clock;
    generate a first timestamp for the first data point;
    receive a second data point from the at least one data source device; and
    calculate a second timestamp for the second data point by adding a computed value to the first timestamp, generated using the time from the at least one reference clock, wherein the computed value represents an amount of time base at least in part upon a number of clock ticks of a clock of the at least one data source device transpiring between measurement of the first data point and measurement of the second data point, each clock tick of the clock of the data source being determined to correspond to a period of time.

* * * * *